Sept. 27, 1932.  J. D. HOLLIDAY  1,879,247
ANIMAL FEEDER
Filed Sept. 5, 1931   2 Sheets-Sheet 1
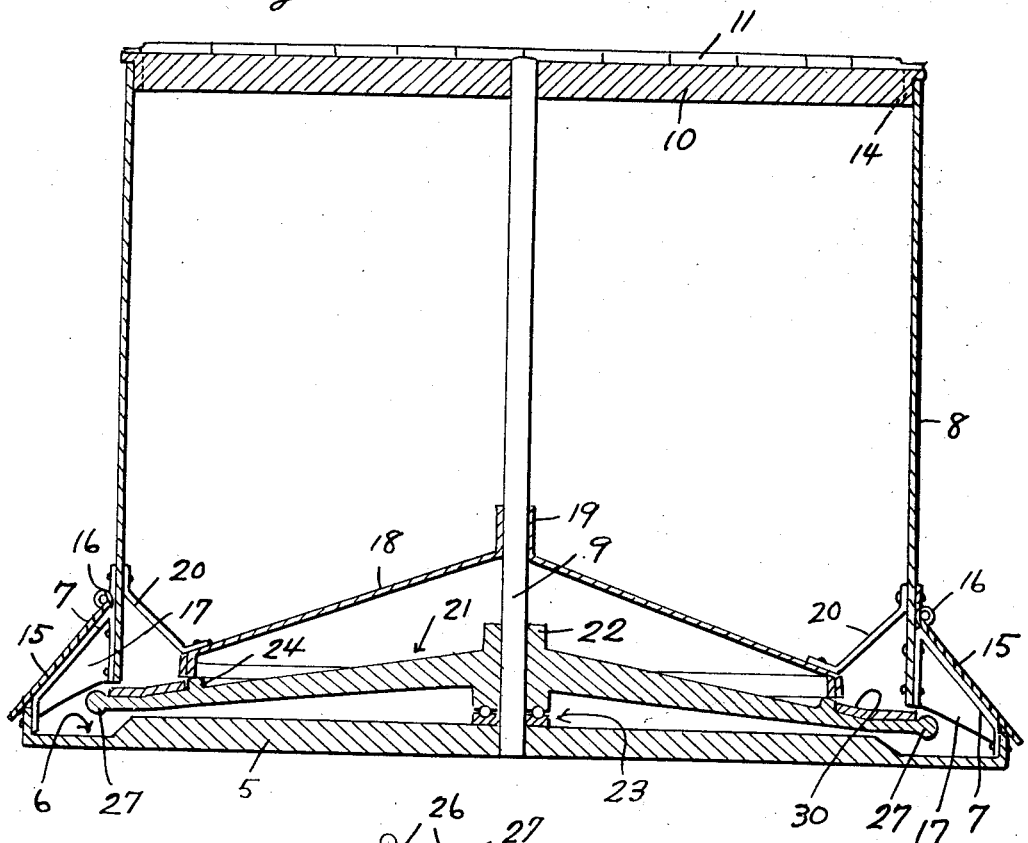
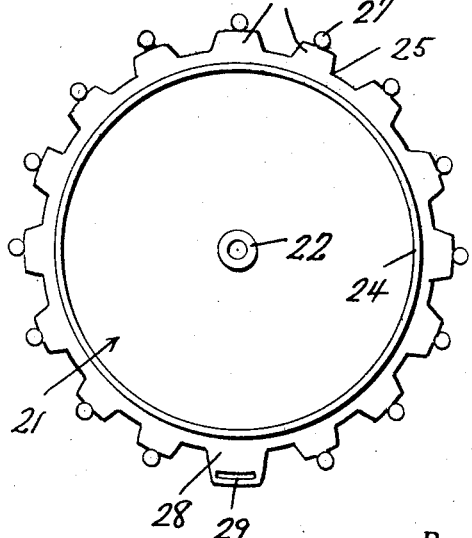
Inventor
John D. Holliday
By Clarence A. O'Brien
Attorney Sept. 27, 1932.  J. D. HOLLIDAY  1,879,247
ANIMAL FEEDER
Filed Sept. 5, 1931  2 Sheets-Sheet 2
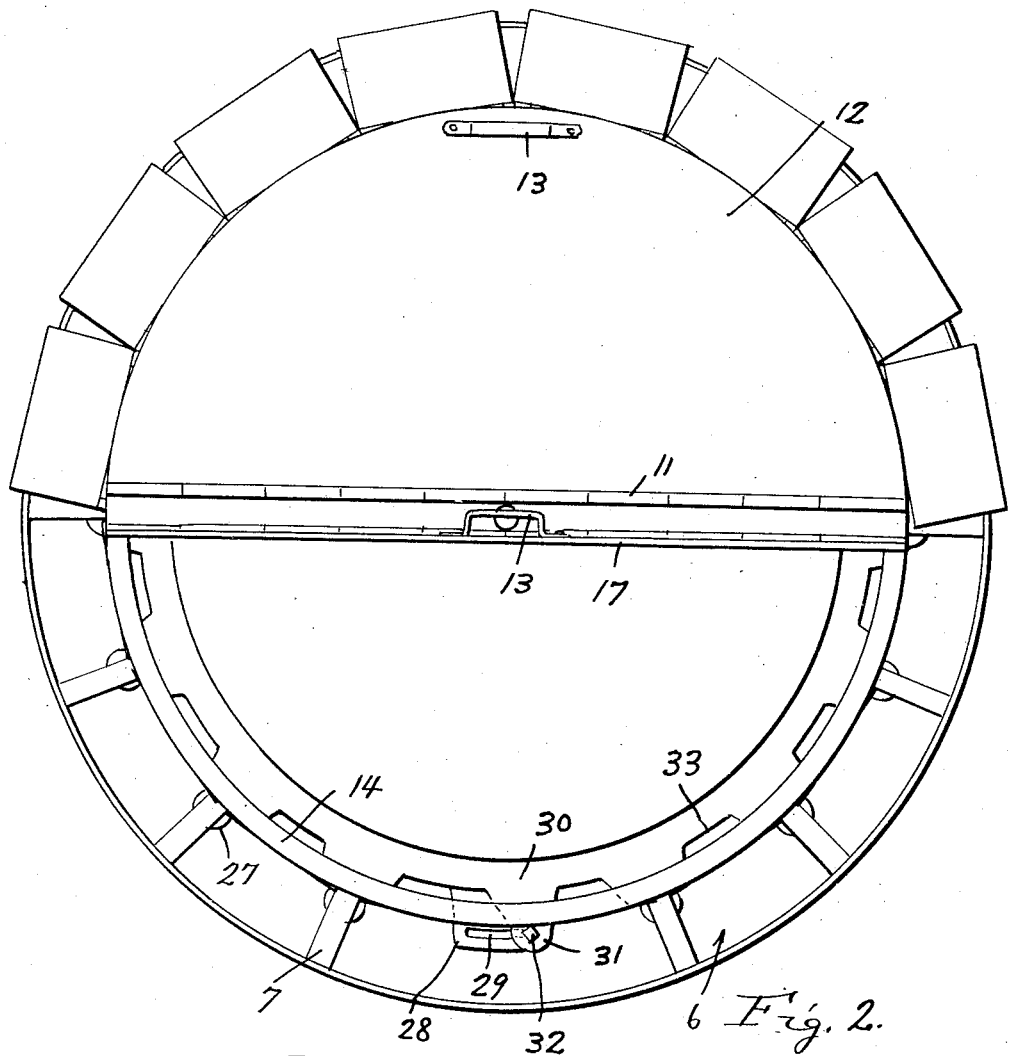
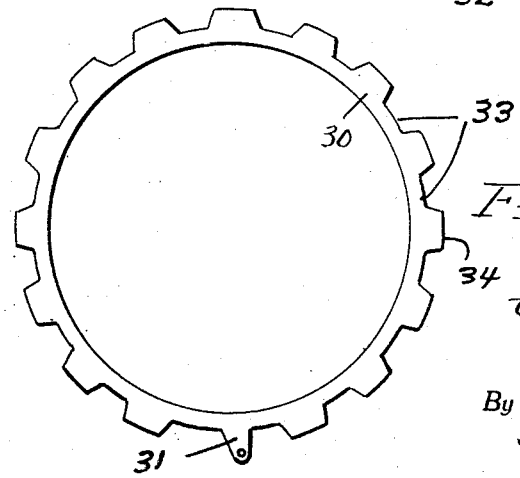
Inventor
John D. Holliday
By Clarence A. O'Brien
Attorney Patented Sept. 27, 1932

1,879,247

UNITED STATES PATENT OFFICE

JOHN D. HOLLIDAY, OF ORCHARD, NEBRASKA

ANIMAL FEEDER

Application filed September 5, 1931. Serial No. 561,435.

This invention relates to an improved animal feeder which is especially but not necessarily adapted for automatically delivering and conveniently feeding hogs.

One feature of novelty is predicated upon the novel base construction which is characterized by a trough and an animal actuated adjustable agitator whose discharge edge is cooperable with the feeding trough formed on the marginal portion of the main base plate, the feature of this arrangement by the animal actuated agitator functioning to prevent clogging of the feed whereby to secure constant supply.

Another feature of the structure is the multiple lid closure means for the edge portion of the agitator and the associated feeding trough.

An additional feature and advantage is accomplished through the use of a rotary agitator having an especially designed peripheral portion together with an annulus associated therewith and constituting a regulator for controlling the supply of food from the main hopper to the trough.

Other features and advantages will become more readily apparent from the following description and drawings.

In the drawings:

Figure 1 is a view in section and elevation showing the complete assembly as constructed in accordance with my ideas.

Figure 2 is a top plan view thereof.

Figure 3 is a top plan view of the animal actuated rotary agitator.

Figure 4 is a top plan view of the regulating annulus.

As before stated the general assembly may be well described by referring to Figure 1. Here the numeral 5 designates a base plate shown as of general disk configuration and top plan view. This plate has its outer marginal portion formed with a channel 6 functioning as a feeding trough. Attached by brackets 7 to the rim portion of the trough is the cylindrical container 8. The lower edge of this container is placed above the trough and occupies a proper position with respect thereto so as to allow the food to gravitate from the container into the trough.

The numeral 9 designates a standard or post which is attached to and rises centrally from the base. Connected to the upper end of this is a cross piece which may be designated as a spider 10 and this serves to accommodate hinges 11 for the closing plates 12, said closing plates having suitable operating hand grips 13. Incidentally there is a top edging ring 14 carried by the upper edge of the cylinder 8 constituting a rest for the peripheral edge portions of the closures 12. I next call attention to the numerals 15 which designate closing lids for the trough 6. These lids are inclined downwardly and hingedly mounted as at 16 and cooperative with the bight portion of the substantially U-shaped bracket 7. It will be noted that each bracket is formed with a weft 17 which constitutes a divider converting the trough into one of cellular form. It is also noted that the lower edge portion of the lid projects beyond the rim of the trough so as to allow the hog to snoot therebeneath and to lift the lid in a manner to permit access to be had to the cells or pockets in the trough.

The numeral 18 designates a substantially conical shield having its neck portion 19 fastened on the standard and having its lower edge portion terminating in spaced concentric relation to the lower portion of the cylinder 8. This shield is maintained in place by appropriate hangers or tie members 20 fastened to the shield and wall of the container respectively.

Interposed between the shield and base and projecting beneath the container 8 and into the trough is the agitator 21. This comprises a disk having a hub 22 mounted on the standard 9. An anti-friction bearing is positioned at 23 to facilitate freedom of rotation by this agitator. The agitator has a marginal rib at 24 and has its peripheral edge formed with circumferentially spaced notches 25 and intervening lugs 26. These lugs are formed with ball extensions 27 adapted to be engaged by the nose of the hog while rooting into the trough thereby rotating the agitator.

I call attention to the numeral 28 which designates an especially formed ear having a slot 29. In addition I call attention to the numeral 30 which designates an annulus constituting a regulator. This surrounds the rib 24 and is provided at a predetermined point and ear 31 and carrying a bolt 32 forming an adjustable connection between the regulator and edge portion of the agitator. The regulator is also formed with notches 33 and intervening lugs 34. The lugs 34 cooperate with the lugs 26 whereby upon adjusting the regulator rotatably with respect to the agitator, the size of the registering notches 25 and 33 may be regulated to control the discharge of feed from the hopper 8 into the trough 6. It is evident therefore that the rotary agitator is of an animal actuated valved type and its present structure is of utmost importance because as it is rotated in either direction has a tendency to loosen the feed and prevent clogging thereof. Consequently a constant flow of feed is practically assured.

I desire to emphasize the arrangement wherein the base 5 is provided with a centralized upright or standard 9 constituting a support for the sleeve portion 19 of the shield 18, as well as a support for the hub and bearing structure of the rotary agitator 21. Then, too, I wish to emphasize the arrangement wherein the marginal rib 24 on the disk like body portion of the agitator serves to maintain the annulus 30 against displacement and facilitate an assemblage of these parts to provide the desired regulating valve action. Another feature is predicated upon the protruding knob or ball-like projection 27 on the peripheral portion of the lug 26, these protruding beneath the shell 8 and into the trough so as to permit them to be conveniently manipulated by the animal for automatically actuating the agitator.

It is thought that the description taken in connection with the drawings will enable a clear understanding of the invention to be had. Therefore, a more lengthy description is though unnecessary.

While the preferred embodiment of the invention has been shown and described, it is to be understood that minor changes coming within the field of invention claimed may be resorted to if desired.

Having thus described my invention, what I claim as new is:

1. In a structure of the class described, a base plate having its marginal portion channeled to provide a feeding trough, a feed hopper supported in spaced relation above the trough portion of the base, a rotary agitator plate supported from said base and including a marginal portion projecting beyond the hopper wall into said trough, the projecting portion of said agitator being formed with animal actuated knobs a plurality of circumferentially spaced brackets connected with the lower portion of the wall of the hopper and rim of the trough, each bracket including a depending web, said web defining individual cells.

2. In a structure of the class described, a base plate having its marginal portion channeled to provide a feeding trough, a feed hopper supported in spaced relation above the trough portion of the base, a rotary agitator plate supported from said base and including a marginal portion projecting beyond the hopper wall into said trough, the projecting portion of said agitator being formed with animal actuated knobs a plurality of circumferentially spaced brackets connected with the lower portion of the wall of the hopper and rim of the trough, each bracket including a depending web, said web defining individual cells, and a plurality of hingedly mounted downwardly and outwardly inclined lids cooperable with the bracket and overlying the trough and projecting beyond the rim of the trough for the purpose stated.

3. An animal feeder of the class described comprising a disk like base having its marginal portion channeled to form a food receiving trough, a standard rising centrally from said base, a cylindrical hopper supported in spaced relation above said base and having its wall arranged concentrically inward of the rim of said trough, a substantially conical shield of a diameter smaller than said hopper, said shield being formed with a neck attached to said standard, spacing and hanger brackets attached to the marginal portion of the shield and adjacent portion of the wall of the hopper to allow the feed to discharge through the space between the shield and said wall and to gravitate into said trough.

4. An animal feeder of the class described comprising a disk like base having its marginal portion channeled to form a food receiving trough, a standard rising centrally from said base, a cylindrical hopper supported in spaced relation above said base and having its wall arranged concentrically inward of the rim of said trough, a substantially conical shield of a diameter smaller than said hopper, said shield being formed with a neck attached to said standard, spacing and hanger brackets attached to the marginal portion of the shield and adjacent portion of the wall of the hopper to allow the feed to discharge through the space between the shield and said wall and to gravitate into said trough, and a rotary agitator comprising a disk having a hub mounted for rotation on said standard, said agitator being interposed between the base and shield having its marginal portion projecting beyond the shield and adjacent the lower edge portion of walls of the hopper, said projecting portion of the agitator being notched to provide discharge openings for the feed, said openings being in registry with said trough.

5. An animal feeder of the class described comprising a disk like base having its marginal portion channeled to form a food receiving trough, a standard rising centrally from said base, a cylindrical hopper supported in spaced relation above said base and having its wall arranged concentrically inward of the rim of said trough, a substantially conical shield of a diameter smaller than said hopper, said shield being formed with a neck attached to said standard, spacing and hanger brackets attached to the marginal portion of the shield and adjacent portion of the wall of the hopper to allow the feed to discharge through the space between the shield and said wall and to gravitate into said trough, and a rotary agitator comprising a disk having a hub mounted for rotation on said standard, said agitator being interposed between the base and shield having its marginal portion projecting beyond the shield and adjacent the lower edge portion of walls of the hopper, said projecting portion of the agitator being notched to provide discharge openings for the feed, said openings being in registry with said trough, a regulator mounted for adjustment on the edge portion of the agitator for regulating the size of the discharge opening.

6. An animal feeder comprising a disk like base plate having a channeled marginal portion defining a feeding trough, a centralized perpendicular standard attached to and rising from said base, a hopper supported from the outer edge portion of the base and spaced above said base to allow food to gravitate from the hopper into the trough, an agitator comprising a disk rotatably mounted on said standard having its outer edge portion projecting through and beyond the space existing between said base and the wall of said hopper, the projecting edge portion of said agitator being formed with circumferentially spaced notches and intervening lugs being in turn formed with animal actuated knobs, and a notched annulus mounted for adjustment on the notched edge portion of said agitator, the notches in the agitator and annulus cooperating to regulate the discharge of food from the hopper into the trough.

In testimony whereof I affix my signature.

JOHN D. HOLLIDAY.